April 25, 1950 G. R. CRANE 2,505,528
FILM SOUND RECORDING SYSTEM
Filed July 29, 1947
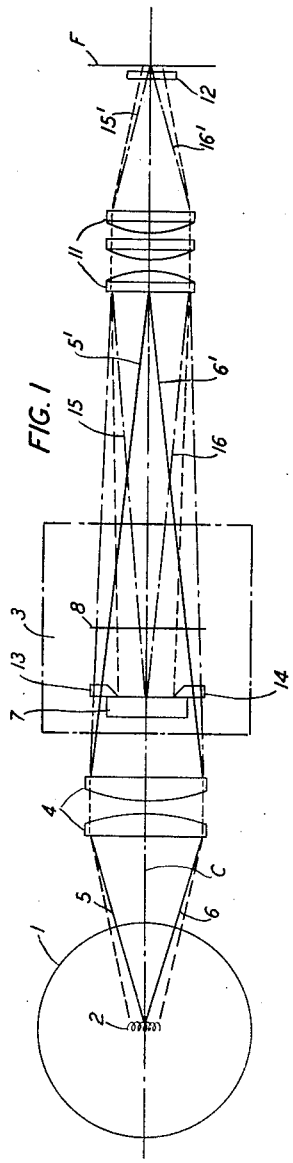
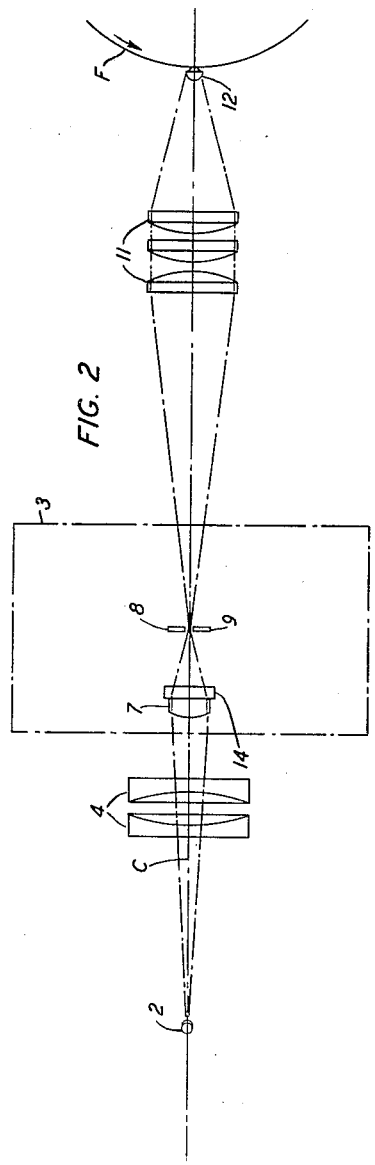
INVENTOR
G. R. CRANE
BY
J. F. McEneany
ATTORNEY Patented Apr. 25, 1950

2,505,528

UNITED STATES PATENT OFFICE 2,505,528

FILM SOUND RECORDING SYSTEM

George R. Crane, Santa Monica, Calif., assignor to Western Electric Company, Incorporated, New York, N. Y., a corporation of New York Application July 29, 1947, Serial No. 764,338
In Great Britain June 13, 1947

3 Claims. (Cl. 179—100.3)

1

This invention relates to sound film recording and particularly to improvements in optical systems employed in combination with a light modulating device to project a sound modulated light beam to a recording film.

It is the object of this invention to provide an inexpensive, compact and highly efficient modulator unit for use in recording sound on photographic film.

It is a further object of this invention to provide a modulator unit incorporating an improved system of condenser lens elements by means of which an intense, striation-free light beam is produced at the plane of the light modulator.

Another object of this invention is to provide a modulator unit incorporating an improved system of lens elements and light masking elements producing an intense, sharply defined and striation-free recording light beam at the recording film plane.

In sound film recording systems, a modulator unit comprises a light source, a light modulating device and lens elements projecting a light beam, first to the light modulating device and from this device to a recording film. It is the usual practice in sound recording systems to employ a light source in the form of a lamp having a coiled filament.

One of the principal requirements for efficient recording on photographic film is the production at the film of an intense, sharply defined light beam of uniform light intensity. While many advantages are obtained by the use of a coiled filament lamp in film recording systems, it is known that the maximum light intensity from a coiled filament lamp cannot be utilized because the filament cannot be focussed directly at the modulating device due to the fact that vertical striations caused by the coiled filament of the light source will appear in the light beam. To eliminate these vertical striations, it is the practice in existing systems to so locate the spherical condenser lens with respect to the light source and the modulating device that the filament of the light source is imaged beyond the modulating device. While this practice has been found necessary in order to eliminate striations in the light beam at the light modulator, it results in the loss of considerable light intensity of the recording light beam.

In accordance with this invention, a novel condenser lens combination is provided by means of which a more intense but striation-free light beam is produced at the plane of the modulating device. Specifically, a pair of plano-cylindrical lenses are provided in the condenser lens system. One cylindrical lens is disposed with its axis at right angles to the longer axis of the coiled filament and is positioned between the light source and the modulating device to form an image of the horizontal component of the lamp filament beyond the modulating device. A second cylindrical lens is disposed with its axis parallel to the longer axis of the coiled filament and is positioned relative to the light source to produce an image of the vertical component of the coiled filament directly at the light modulating device. The use of this novel arrangement of condenser lenses produces a more intense, striation-free light beam at the light modulating device by reason of the fact that only the horizontal component of the coiled filament is imaged beyond the modulating device to eliminate vertical striations in the light beam at the modulator, while the vertical component of the filament is imaged at the plane of the modulating device, thus increasing the light intensity of the beam at this point.

Further in accordance with this invention, an arrangement of lenses and light masking elements is provided by means of which both the vertical and horizontal edges of the light beam are sharply defined at the film plane. This object is accomplished by the provision of a masking element defining the vertical edges of the light beam, which element is displaced from the modulating device along the optical axis in the direction of the light source. The masking element and a spherical lens of the objective lens system are so positioned with respect to the film plane that the masking element is imaged at the film plane by the spherical objective. The horizontal component of the modulating device, which would be imaged beyond the film plane by the spherical objective lens alone, is focussed at the film plane by a further objective lens in the form of a plano-cylindrical lens disposed with its axis transverse to the film.

The light modulating device employed in the recording system to be described in this specification is a light valve of the type disclosed in United States Patent 1,638,555, August 9, 1927, to E. C. Wente, in which a pair of spaced, parallel conducting ribbons are immersed in a constant magnetic field. The light valve ribbons are disposed in the optical system with their longer axis transverse to the recording film to thus define the upper and lower edges of the light beam projected to the film. The ribbons move toward and away from each other in response to sound modulated currents passing therethrough.

This invention will be more readily understood by reference to the accompanying specification and drawings in which:

Fig. 1 is a schematic plan view of the modulator unit in accordance with this invention; and Fig. 2 is a schematic side elevation of the modulator unit shown in Fig. 1.

Referring to Fig. 1, the modulator unit in accordance with this invention includes a light source 1 having a coiled filament 2, a light valve 3 for modulating the light received from the light source 1 and condenser and objective lens systems for projecting light from the source to the light valve and from the light valve to a recording film F.

A condenser lens system disposed between light source 1 and light valve 3 includes a cylindrical lens 4 disposed with its axis at right angles to the longer axis of the coil filament 2. Lens 4 images the horizontal component of the coil of filament 2 beyond the light valve 3, as indicated by lines 5, 5' and 6, 6'. Cylindrical lens 4 is shown as two similar positive plano-cylindrical lenses forming a doublet. While a single positive plano-cylindrical lens may be used at this point, less aberration results when the double positive plano-cylindrical lens is employed as shown in the drawing.

A second lens of the condenser lens system consists of a positive plano-cylindrical lens 7 disposed in the optical system with its axis parallel to the longer axis of the coil filament 2. As shown clearly in Fig. 2, the lens 7 images the vertical component of the filament 2 at the plane of light valve ribbons 8 and 9. These ribbons lie on opposite sides of the center line C of the optical system and form a light transmitting slot between their adjacent edges.

By use of the condenser lens system described above, a more intense, striation-free light beam is produced at the plane of the light valve ribbons by reason of the fact that the horizontal and vertical component of the coiled filament 2 are separately imaged. The horizontal component, in the image of which vertical striations will appear, is imaged at a plane other than the ribbon plane while the vertical component of the filament is imaged at the ribbon plane to thereby make available at the light valve a greater proportion of the light intensity available at the light source. As the movable ribbons of the light valve are imaged at the film plane by an objective lens system, the production of a uniform light beam of high intensity at the ribbon plane results in an improved sound track image on the recording film.

An objective lens system comprises spherical lens unit 11 and a positive plano-cylindrical lens 12 located close to and with its axis disposed transversely of the film F. This combination of spherical and cylindrical lenses in the objective lens system produces an image at the film plane in which the height dimension of the light beam formed by ribbons 8 and 9 is substantially reduced for relatively small reduction of the width or horizontal dimension of the beam. It has been found that the greater the reduction of the height of the image at the film plane the greater will be the reduction of distortion in the recorded sound caused by loss of high frequency signals due to ribbon velocity effect and variable cancellation of high frequencies occurring at certain image heights for certain signal frequencies.

In sound film recording systems both the vertical and horizontal edges of the light beam projected to the recording film should be sharply defined. Difficulties have been encountered in earlier recording systems of the type described in producing an image at the film in which the vertical edges are sufficiently well defined when the horizontal edges are brought to the best focus by an objective lens system of the type described.

In accordance with this invention, vertical edge masks are provided in the optical system at a plane separated from the plane of the light valve ribbons and are imaged at the film plane by one of the lens elements of the objective lens system. Referring to Fig. 1, masking elements 13 and 14 are provided in the optical system to mask the ends of the light beam and thereby define the vertical edges of the light beam. These masks are coplanar and are disposed in the optical system at a point between lens 7 and the light valve ribbons such that the conjugate foci of spherical lens 11 are positioned, respectively, at the film F and at the plane of masks 13 and 14. Therefore, as indicated by lines 15, 15' and 16, 16', the masks 13 and 14 are imaged by lens 11 at the plane of the recording film F.

The position of the lens 7 and masks 13 and 14 in this compact optical system is such that they come within the area occupied by the light valve 3 and are, therefore, mounted in the aperture of one of the pole-pieces of the light valve.

This novel arrangement of masking element and objective lens combined with the novel condenser lens system producing an intense, striation-free light beam at the light valve, provides an efficient, compact and relatively inexpensive modulator unit for the recording of sound on photographic film.

What is claimed is:

1. In combination in a sound film recording system having an elongated coiled filament light source and a light modulating device, a condenser lens system for projecting a light beam from said source to said modulating device comprising a pair of crossed plano-cylindrical lenses disposed in said system to image the horizontal component of said filament beyond said modulating device and to image the vertical component of said filament at said modulating device, a mask defining the vertical edges of said light beam disposed between said condenser lens system and said modulating device and an objective lens system including a spherical lens element, the conjugate foci of said spherical lens being positioned, respectively, at said mask and at said film.

2. The combination in a system for recording sound upon a light sensitive film, an elongated light source having its longer axis disposed transversely to said film, a light modulating device, masking means between said light source and said modulating device for limiting the light passed to said modulating device in the horizontal dimension, a condenser lens system comprising a first cylindrical lens having its axis parallel to the longer axis of said light source and positioned to form an image of the vertical dimension of said light source at said modulating device and a second cylindrical lens having its axis normal to the axis of said first cylindrical lens and positioned to form an image of the horizontal dimension of said light source beyond said modulating device, an objective lens system comprising a spherical lens positioned to form an image of said masking means at the film plane and an image of said modulating device beyond the film plane and a cylindrical lens having its axis transverse to said film and positioned between said spherical lens and said film to image the vertical dimension of said light modulating device at the film plane.

3. In combination in a system for recording sound upon a light sensitive film, an elongated light source having its longer axis disposed transversely to said film, a light modulating device, masking means between said light source and said light modulating device for defining the vertical edges of the light beam passed to said modulating device, a condenser lens system comprising a pair of crossed plano-cylindrical lenses, one of which images the vertical component of said light source at said modulating device and the other of which images the horizontal component of said light source between said modulating device and said film, an objective lens system comprising a spherical lens and a plano-cylindrical lens having its axis transverse to said film, the spherical lens of said objective lens system forming an image of said masking means at the plane of said film.

GEORGE R. CRANE.

REFERENCES CITED

The following references are of record in the file of this patent:

UNITED STATES PATENTS

| Number | Name | Date |
|---|---|---|
| 1,747,261 | Poulsen | Feb. 18, 1930 |
| 1,840,794 | Round | Jan. 12, 1932 |
| 1,940,937 | Burt | Dec. 26, 1933 |
| 2,010,951 | Hardy | Aug. 13, 1935 |
| 2,036,622 | Emmerich | Apr. 7, 1936 |
| 2,120,263 | Ross | June 14, 1938 |
| 2,157,166 | Dimmick | May 6, 1939 |
| 2,158,308 | Sachtleben | May 16, 1939 |
| 2,164,827 | Levin | July 4, 1939 |
| 2,272,795 | Dimmick | Feb. 10, 1942 |
| 2,426,367 | Maurer, Jr. | Aug. 26, 1947 |